Jan. 31, 1939.  A. CRAWFORD  2,145,754
STOP MOTION FOR KNITTING MACHINES
Filed April 21, 1937   12 Sheets-Sheet 1

Inventor
Alfred Crawford.
by his Attorneys
Howson & Howson

Jan. 31, 1939.    A. CRAWFORD    2,145,754
STOP MOTION FOR KNITTING MACHINES
Filed April 21, 1937    12 Sheets-Sheet 8

Inventor:
Alfred Crawford
by his Attorneys
Howson & Howson

Jan. 31, 1939. A. CRAWFORD 2,145,754
STOP MOTION FOR KNITTING MACHINES
Filed April 21, 1937 12 Sheets-Sheet 10

Inventor:
Alfred Crawford
by his Attorneys
Howson & Howson

Jan. 31, 1939. A. CRAWFORD 2,145,754
STOP MOTION FOR KNITTING MACHINES
Filed April 21, 1937 12 Sheets-Sheet 12

Inventor
Alfred Crawford
by his Attorneys

Patented Jan. 31, 1939

2,145,754

UNITED STATES PATENT OFFICE 2,145,754

STOP MOTION FOR KNITTING MACHINES

Alfred Crawford, New Brunswick, N. J., assignor to Crawford Manufacturing Company, New Brunswick, N. J., a corporation of New Jersey Application April 21, 1937, Serial No. 138,248

12 Claims. (Cl. 66—163)

This invention relates to stop motions for knitting machines of the circular type; and particularly to improvements to stop motions of the type disclosed in my prior U. S. Letters Patent No. 1,992,860, dated February 26, 1935.

In machines of the type disclosed in the above noted patent there is a mechanical unit for controlling the driving of the machine which remains, as a whole, in a stationary position. There is also a plurality of devices for detecting irregularities in a number of individual threads which are simultaneously fed to the needles of the knitting machine. These detectors, in the case noted, revolve about a common axis, coincident with the axis of the needle cylinder with the revolving cam ring. These detectors form part of an electrical system which also includes a motor unit. The motor unit actuates a trip shaft for effecting stopping of the machine when any irregularity occurs in the tension or continuity of any one of the knitting threads.

The trip shaft and its actuating motor also revolve about the axis of the machine, with the cam ring, and upon operation of the trip motor the trip shaft is released and this in turn releases a plunger which drops into notches formed in a floating ring concentrically mounted with respect to the axis of the machine. The floating ring normally remains in a quiescent state in the bed of the machine.

The floating ring is connected to the mechanical power or drive control unit and when said ring is caused to rotate with the cam ring by the trip plunger dropping into one of the notches of the ring, as above noted, the ring will cause actuation of the power control unit and consequent stopping of the machine.

The above described arrangement, while it is quicker in action than the usual fully mechanical stop motions commonly used, nevertheless, is not quick enough to prevent press-offs from a relatively large number of needles if the knitting threads break relatively close to the thread guides which deliver the threads to the needles.

The above condition is directly due to the fact that there is a certain amount of elapsed time between the operation of the trip shaft and the operation of the floating ring, while the trip plunger is making driving connection with and causing rotation of the floating ring; and this, measured in degrees of rotation of the cam ring relative to the needles, together with the distance from the thread guide at which the break in the knitting thread occurs, is responsible for the extent of the resultant press-off.

The principal object of the present invention is to quicken the action of the stop motion in order to prevent, or reduce to a minimum the extent of press-offs caused by a knitting thread breaking close to the needles.

The principal object, noted above, is attained by an arrangement of parts in which the trip motor unit is made stationary and directly connected to the drive or power control unit, whereby the elapsed time, above noted, between the actuation of the trip motor and the operation of the drive control mechanism is eliminated; and by direct electrical connections at all times between the detectors and the trip motor.

The improvements constituting the subject matter of the present invention will be readily understood from the following specification, taken in connection with the accompanying drawings; of which.

In the machine illustrated in Figs. 1 to 4 inclusive, the main bed plate of the machine is indicated at 1. The bed plate 1 is supported, in the usual manner, by legs or frame members 2, 2. The needle cylinder 3 is supported by and, in the present instance, is fixed to the main bed plate 1, in the usual manner. The cam ring 4, in the present instance, is rotatably supported by the bed plate 1 and is adapted to be rotated about the axis of the needle cylinder 3, in the usual manner, through the usual gearing (not shown), from the main drive shaft 5 of the machine. A main driving pulley 6 is adapted to revolve freely on the drive shaft 5 and to be operatively connected to the drive shaft, for rotating the same, in the present instance, through a suitable clutch mechanism 7. The clutch 7 is co-operatively associated with the drive shaft 5 and with the driving pulley 6. The driving pulley 6 is arranged to be connected to any suitable source of motive power through a suitable belt (not shown).

Figures 1, 8, 9:
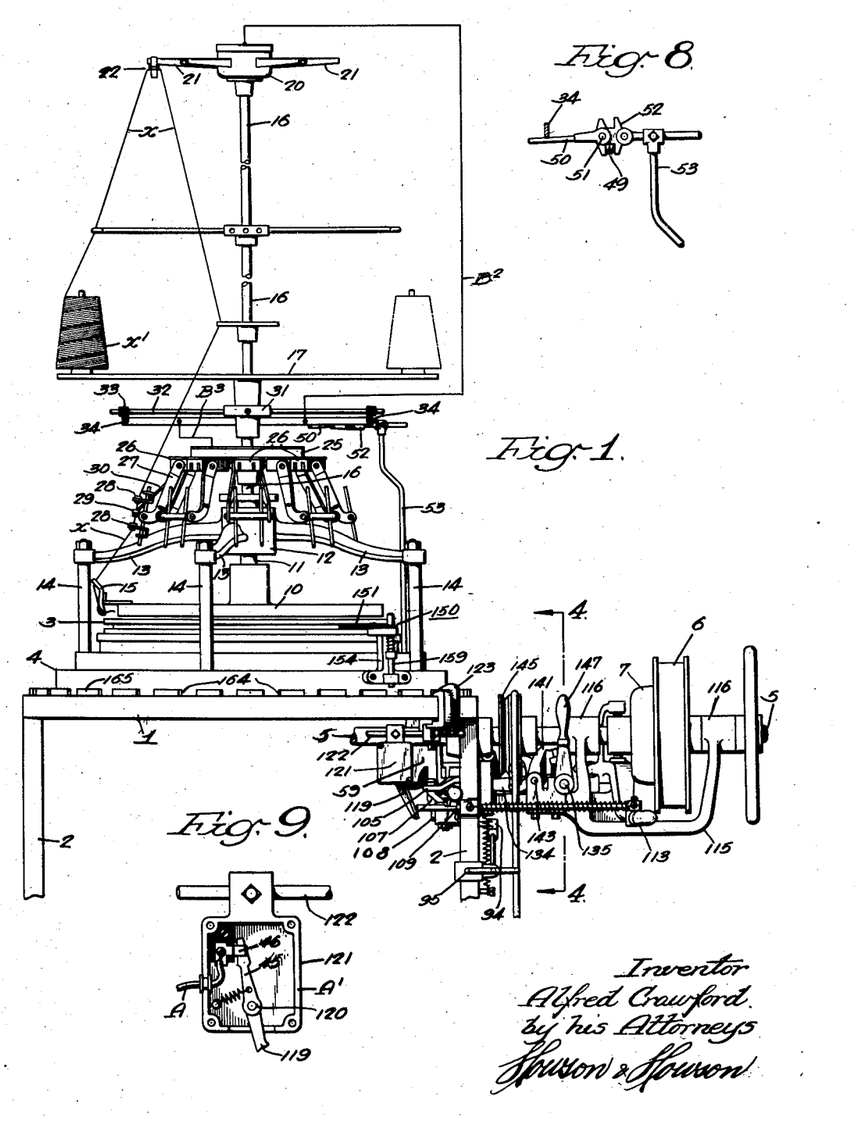
Fig. 1 is a front elevation of a conventional type of circular knitting machine, more especially a "Scott and Williams" wide, multifeed machine, equipped with a stop motion made in accordance with the principles of the present invention.
Fig. 8 is a side elevation of a current collector or trolley forming part of the mechanism of the present invention.
Fig. 9 is a face view of an electric switch employed in connection with the present invention.

The machine illustrated in Fig. 1 also comprises a dial cap, when a rib machine is used, or a cylinder head plate 10 when a plain machine is used. The plate 10 is secured to a vertical shaft 11 arranged in axial alignment with the needle cylinder 3 and cam ring 4, said shaft being secured in the hub 12 of a spider which also comprises arms 13, 13. The spider arms 13, 13 are supported at their outer ends by vertical posts 14, 14, which are secured in the cam ring 4, for rotation therewith about the axis of the needle cylinder 3, whereby the plate 10 is rotated in unison with the cam ring 4.

The plate 10, in the present instance, carries a plurality of thread guides 15 by which a series of knitting threads, one of which is illustrated at $x$ in Fig. 1, are fed to the needles (not shown) at relatively spaced points around the circumference of the needle cylinder.

The spider hub 12 also carries a vertically extending shaft or standard 16 in axial alignment with and, if desired, forming a continuation of the shaft 11.

On the standard 16 is supported a spider or other suitable support 17 for the yarn packages $x^1$, from which the knitting threads $x$ are respectively drawn.

Secured to the upper end of the standard 16 is a casing 20 which is provided with a series of radially extending arms 21. At the outer end of each of the arms 21 is a thread guide and detector 22 over which one of the knitting threads $x$ passes and which, together with mechanism contained within the casing 20, constitutes an abnormal tension and broken thread detector for the thread $x$, said abnormal tension and broken thread detecting mechanism being clearly disclosed in detail in the above-mentioned prior patent, in view of which further description herein will be unnecessary.

The standard 16, intermediate the spider 12 and casing 20, is also provided with a casing 25 in the form of a hollow ring. Secured to the ring casing 25 is a plurality of radially extending switch housings 26 which are respectively provided with arms 27. Supported by the arms 27, 27 are thread guides 28, 28 respectively, through which the threads $x$ pass in going from the detectors 22 to the thread feed guides 15.

Intermediate each pair of thread guides 28, 28, each thread $x$ passes through an eye 29 which is carried by the outer end of a finger 30. Each finger 30 is pivotally mounted in a switch housing 26 and controls a movable switch element therein for detecting subnormal tension or slack in each of the knitting threads $x$.

The ring casing 25, the complement of switch housings 26 and other associated mechanisms for detecting irregularities in the threads $x$ while the knitting machine is in operation are clearly disclosed, in detail, in the above noted prior patent, in view of which further description will be unnecessary for the purpose of the present invention.

The standard 16 also supports a hub 31 which is provided with radial arms 32 each having at its outer end a bracket 33 composed of material non-conductive of electricity or of metal suitably insulated from the arms 32. The brackets 33, 33 collectively support a ring 34.

The ring 34 is electrically connected by a conductor $B^2$ to a switch element 35 enclosed within the upper casing 20 and which is adapted to make contact with either one or the other of a pair of movable switch elements 36 and 37 respectively which are arranged to be operated into contact with the fixed switch element 35 by actuation of one of the thread detectors 22 when moved downwardly, under abnormal tension in the thread $x$ or when moving upwardly as a result of the thread breaking at a point remote to the feed guide 15 or becoming otherwise disengaged from the detector 22. Such contact between the switch elements 35, 36 or 35, 37 will effect stopping of the knitting machine in a manner hereinafter described.

The ring 34 is also connected by a conductor $B^3$ with a conductor ring 40 which is mounted in the hollow ring 25 and suitably insulated therefrom, as disclosed in the previously mentioned prior patent.

Electrically connected to the ring 40 are fixed switch elements 41 which are adapted to be engaged by movable switch elements 42, 42 respectively controlled by the fingers 30, 30 and which, if the knitting thread becomes abnormally slack or breaks, especially if such break or slackness occurs in the vicinity of the thread guide 15, swing outwardly to effect coaction between the switch elements 41 and 42. Such contact between any pair of the switches 41—42 will also effect stopping of the machine in the manner hereinafter described.

Figure 16:
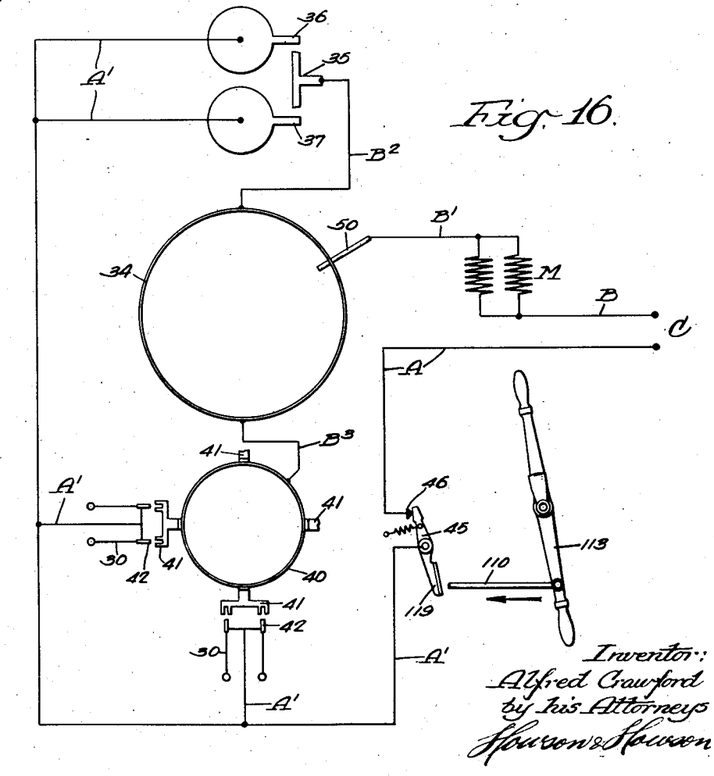
Fig. 16 is an electric diagram illustrating the connections between the various elements of the stop motion.
Figure 17:
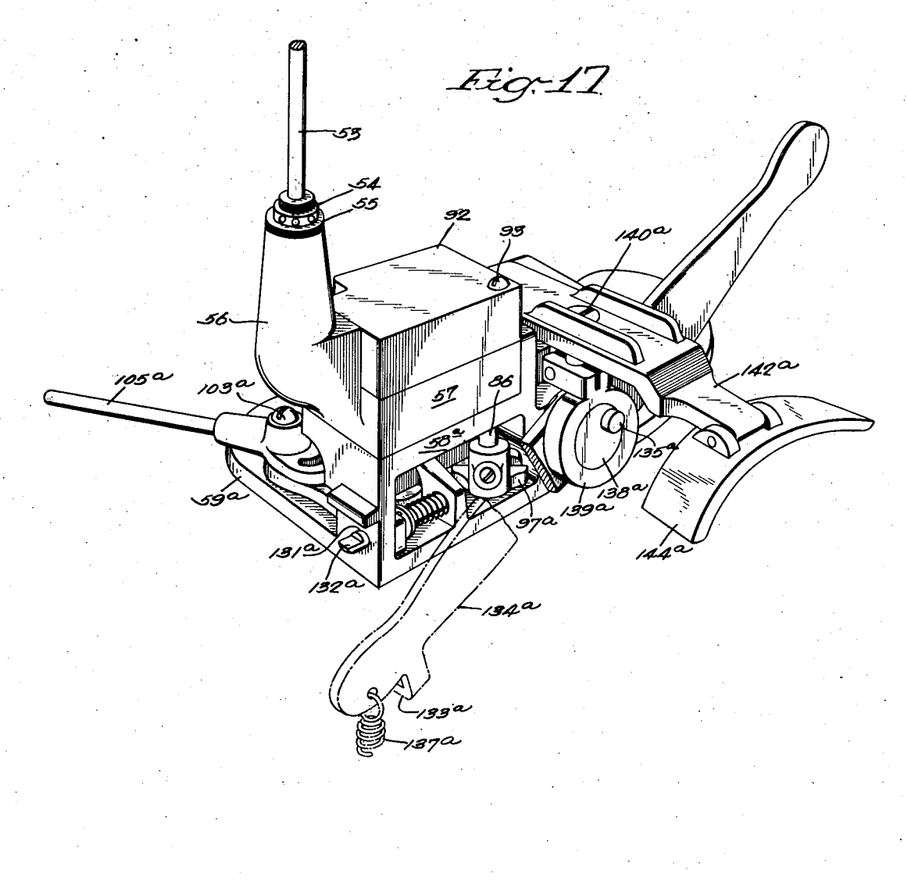
Fig. 17 is a perspective view of the motor unit and associated parts as adapted for application to a "Stafford and Holt" machine.
Figures 18, 19, 20, 21:
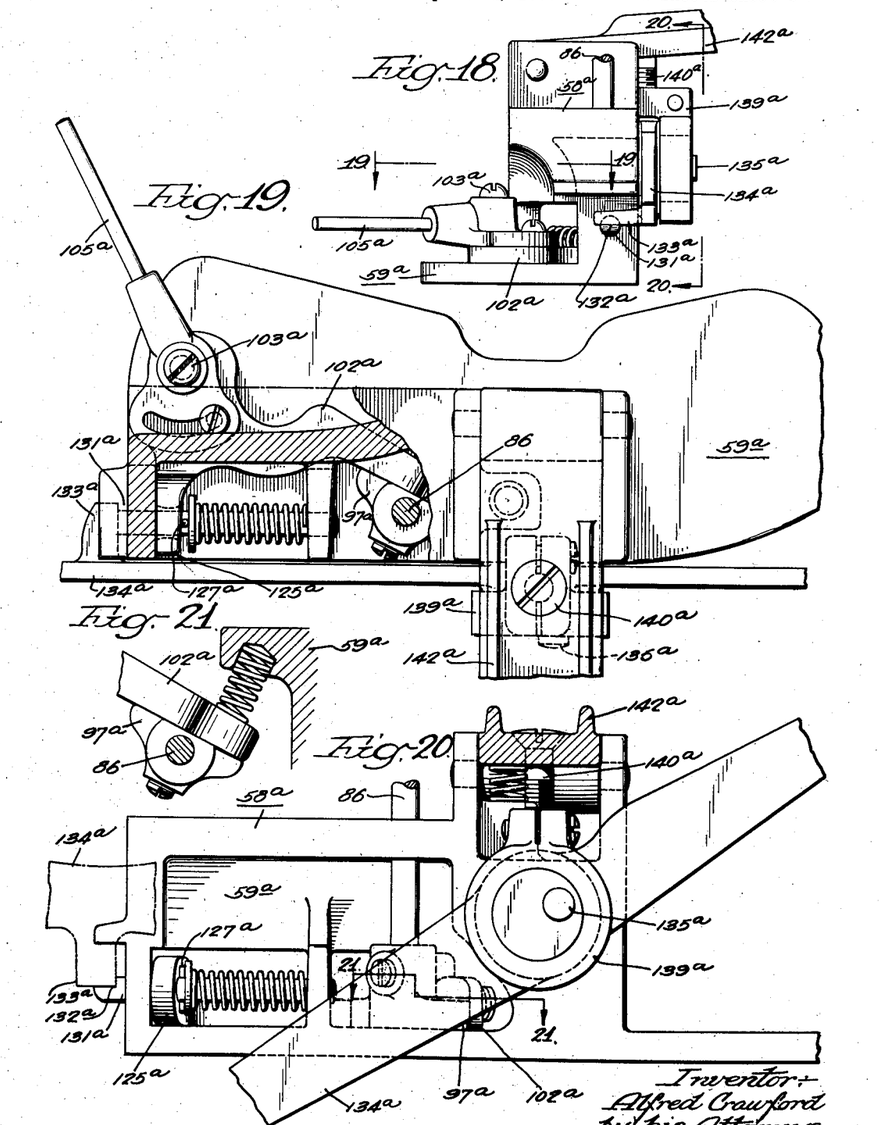
Fig. 18 is an end view of the mechanism shown in Fig. 17.
Fig. 19 is a plan view partly in section as taken on the line 19—19, Fig. 18.
Fig. 20 is a sectional elevation as viewed on the line 20—20, Fig. 18.
Fig. 21 is a sectional plan view taken on the line 21—21, Fig. 20.
Figure 22:
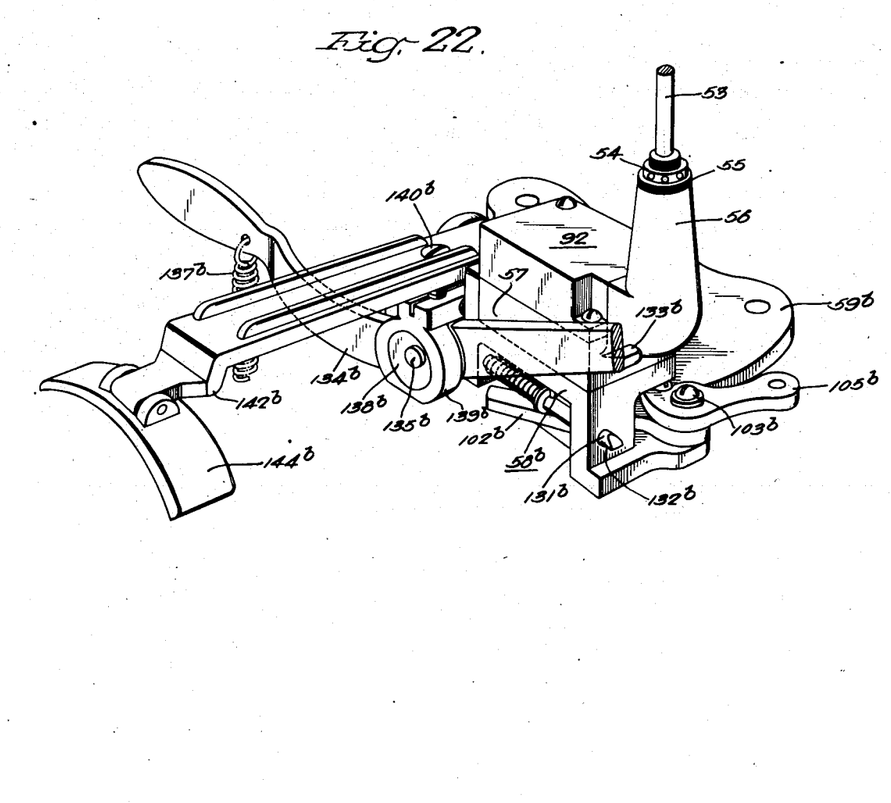
Fig. 22 is a perspective view of the motor unit and associated parts adapted for application to a "Leighton" machine.
Figures 23, 25, 26:
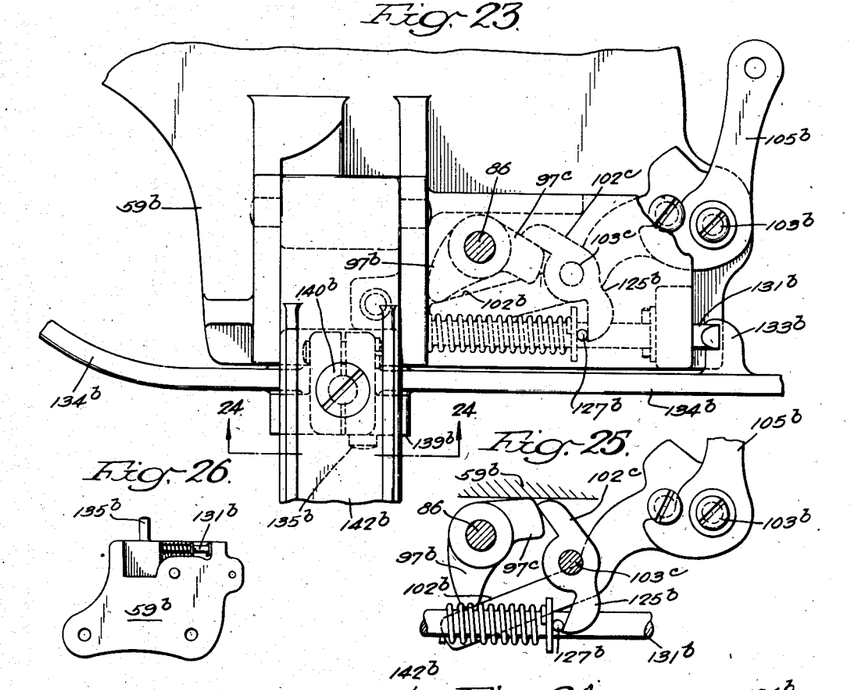
Fig. 23 is a plan view of the mechanism shown in Fig. 22.
Fig. 25 is a fragmentary plan view, partly in section, illustrating the bolt-actuating mechanism in different positions from those illustrated in Fig. 23.
Fig. 26 is an inverted plan view of the motor unit bracket of Figs. 22, 23 and 24.
Figure 24:
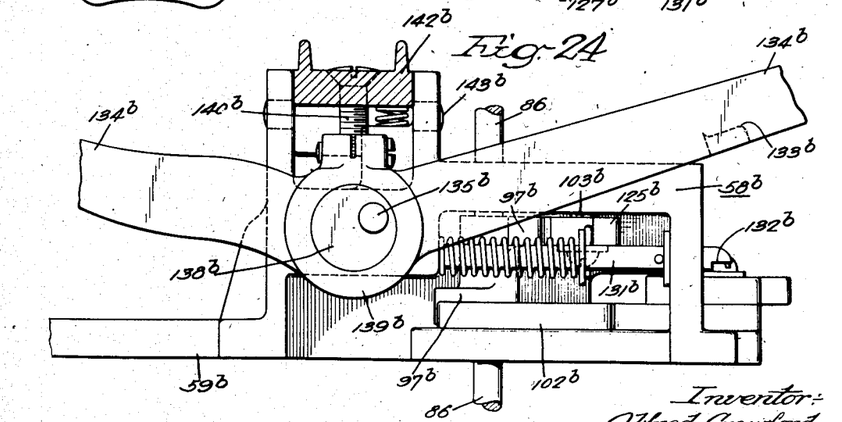
Fig. 24 is a sectional elevation as viewed from the plane illustrated by the line 24—24, Fig. 23.

The switch elements 42 and the switch elements 36 and 37 in the present instance are grounded in the metallic parts of the machine which, in the present instance, constitutes one portion of one side of the electrical circuit of the stop motion, as indicated at $A^1$ in Fig. 16. Also grounded in the metal of the machine is a switch element 45, illustrated in detail in Fig. 9, which is adapted to make contact with a fixed switch element 46, while the machine is running, and to break contact therewith when the machine is manually or automatically stopped in the manner hereinafter described.

The switch element 46 is adapted to be connected by a suitable conductor A to one side of a source of current C. The conductor A, together with the metal parts of the machine which are diagrammatically illustrated as a conductor $A^1$, complete the one side of the electrical circuit of the stop motion.

The second side B of the electrical circuit is connected to one side of the source of current C and to one side or end of a pair of coils or windings of an actuating motor M. The opposite side or ends of said motor windings are connected by a conductor $B^1$ to a trolley 50 which makes contact with the collector ring 34, during relative rotations therebetween. The trolley 50, in the present instance, is maintained in a fixed position while the ring 34 revolves with the cam ring 4.

The trolley 50, in the present instance, is pivotally mounted at 51 on a bracket 52 with a spring 49 therebetween and forcing the trolley 50 at all times into electrical contact with the ring 34. The bracket 52 is adjustably carried by and on the upper end of a trolley pole 53, the lower end of which is mounted in a supporting plug 54. The plug 54, in the present instance, is threaded into an insulating bushing 55. The bushing 55 is externally threaded and is secured in a correspondingly threaded opening formed in one end of a trolley-supporting bracket 56.

The trolley-supporting bracket 56 is provided with a hollow base 57 which is secured to a platform 58, forming part of a motor-supporting bracket 59.

Figure 11:
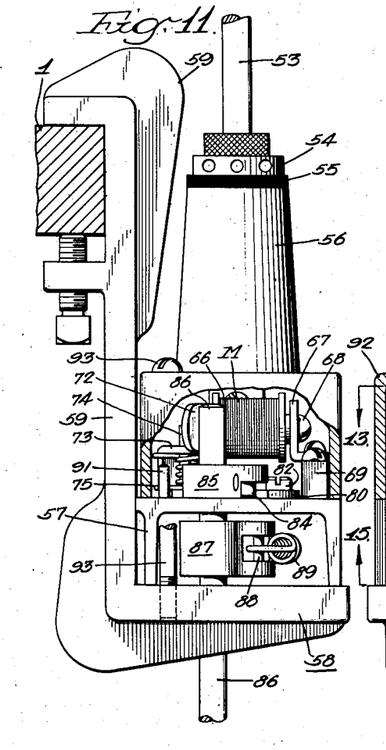
Fig. 11 is an end view of the motor unit and its supporting bracket with a portion of the motor unit casing broken away.

The supporting bracket 59 for the motor unit is arranged to be clamped rigidly to the base plate 1 of the machine, in the manner illustrated in Fig. 11.

The lower end of the trolley pole 53 is threaded into the plug 54 which is composed of electric conducting material and to which one end of the conductor $B^1$ is secured by a screw 54a. The opposite end of the conductor $B^1$ is connected to the operating motor M.

Figure 12:
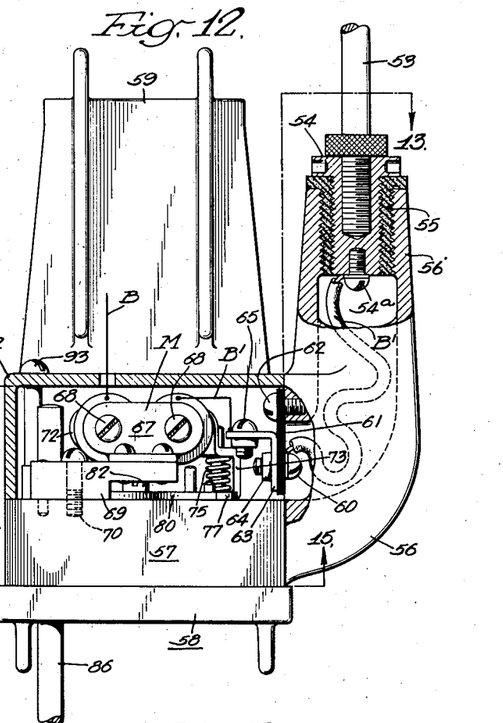
Fig. 12 is a side elevation of the motor unit and supporting bracket with portions thereof broken away for the purpose of illustration.
Figure 13:
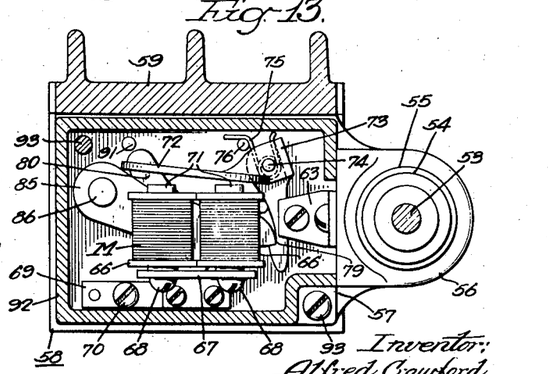
Fig. 13 is a sectional plan view taken on the line 13—13, Fig. 12.

For the purpose of convenience in assembling the parts of the mechanism the conductor $B^1$ is formed in two parts. One end of one part of the conductor $B^1$ is secured to a screw 60 which passes through an insulating plate 61. The insulating plate 61 is secured to the bracket 56 by means of screws 62 (see Fig. 12). The screw 60 also passes through one leg of an angle piece 63 and is provided with a nut 64 by which the angle piece 63 is secured to the insulating plate 61. The second end of the second part of the conductor $B^1$ is connected by a bolt 65 to the second leg of the angle piece 63.

The motor M, in the present instance, is in the form of an electromagnet and comprises a pair of coils 66, 66 which are secured to a supporting bracket 67 by screws 68, 68 respectively. The bracket 67 in the present instance is secured to a motor mounting in the form of a block 69 which in turn is secured by a screw 70 to the base 57 of the bracket 56. The motor M may be insulated from the metallic parts of the machine in any suitable manner, as, for example, by making the motor mounting 69 of non-conductive material or said mounting may be composed of non-magnetic material which will not interfere with the proper functioning of the motor M.

Each of the coils 66 encircles a fixed magnetic core 71. The cores 71, 71 are adapted to be energized by current passing through said coils 66, 66. Projecting across the axes of the coils 66 and magnetic cores 71 thereof is a movable armature comprising a plate 72 which forms one arm of a bell-crank lever 73. The bell-crank lever 73 is pivotally mounted on a stud 74 which is secured in and projects vertically from the base 57 of the bracket 56. A spring 75 encircles the stud 74 and has one end in operative engagement with the lever 73 and its opposite end in engagement with a pin 76 projecting vertically from the base 57, to move the armature plate 72 away from the ends of the magnetic cores 71 upon de-energization of the coils 66.

The bell-crank lever 73 comprises a second arm 77 which under action of the spring 75 is normally held in contact with a pin 78 mounted in the base 57 and by which swinging movement of the armature plate 72 away from the cores 71 is limited. The arm 77 of the bell-crank lever 73 is in the form of a latch, in that it is provided with a notch 79 into which projects a pointed extremity of one arm 81 of a tumbler lever 80.

The tumbler lever 80 is pivotally mounted on the upper horizontal surface of the base 57 and includes a second arm 82 which is provided with a recess 83 arranged to receive and hold a locking and setting pin 84. The pin 84 is carried on and by the outer end of a locking and setting arm 85.

The arm 85 is secured to the upper end of a trip shaft 86. The trip shaft 86 is pivotally mounted in suitable bearings formed in the base 57 and in the bracket platform 58 respectively, and projects downwardly from and below the platform 58.

Figure 14:
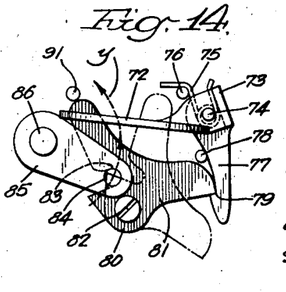
Fig. 14 is a detail plan view of the motor activated latch mechanism embodied in the motor unit shown in Figs. 10 to 13 inclusive.
Figure 15:
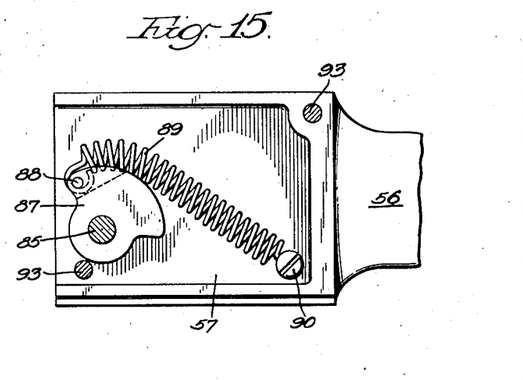
Fig. 15 is an inverted plan view, partly in section as taken on the line 15—15, Fig. 12.

Within the hollow base 57, and secured to the trip shaft 86, is a power lever 87 to which is secured, at 88, one end of a motivating spring 89. The opposite end of the spring 89 is secured, by a screw 90, to the platform 58, in the present instance. The tension of the spring 89 tends to rotate the trip shaft 86 and swing the locking and setting arm 85 in the direction of the arrow y, Fig. 14, into contact with a limit stop 91 carried by the platform 58, in the present instance.

The whole of the motor unit just described is enclosed within a casing 92 which is secured to the base 57 of the bracket 56 and in turn to the platform 58 of the clamp bracket 59 by means of screws 93.

Rotation of the trip shaft 86 in the direction of the arrow y (Fig. 14), in the manner above noted and by which stopping of the machine is effected in a manner and by a mechanism hereinafter described, is normally prevented by the tumbler lever 80. Swinging of the tumbler 80 about its pivot 82 from the full line position in Fig. 14 to the broken line position in said figure to release the holding arm 85 is normally prevented by the trip latch formed by the arm 77 of the bell-crank lever 73. Energization of the motor M causes the bell-crank lever 73 to swing about its pivot 74, causing the latch 77 to release the tumbler 80 which in turn swings about its pivot and releases the arm 85 permitting the trip shaft 86 to rotate and thereby effect stopping of the machine.

The trip shaft 86 is provided, below the platform 58, with a resetting lever 94 to the outer end of which is pivotally connected one end of a resetting rod 95. The resetting rod 95 projects forwardly and its forward end is slidably mounted in a bearing 96 carried by one of the frame members 2, in order that the latch 77, the tumbler 80, and locking arm 85 may be reset after each release of the latch by actuation of the motor M, bringing the elements noted into the relation shown in Fig. 14, ready for actuation to stop the machine again upon energization of the motor M by a closing of the circuit to either of the switches 35—36 or 35—37 or 42—41.

Also secured to the trip shaft 86 is a trip lever 97. The trip lever 97 is provided at its outer end with a pin or screw 98 arranged to operate in an elongated slot 99 formed in one end and extending longitudinally of a link 100. The opposite end of the link 100 is pivotally connected at 101 to the outer end of a second trip lever 102. The trip lever 102 is secured to a vertical knock-off shaft 103 which is rotatably mounted in bearings 104 carried by the machine frame member 2. Also secured to the knock-off shaft 103 is a knock-off lever 105. The knock-off lever 105 is arranged to ride a cam surface 106 formed on one end of a retaining lever 107. The retaining lever 107 is pivoted at 108 to the frame member 2. The opposite end of the lever 107 normally rests in a notch 109 which is formed in the upper side of a shift rod 110 adjacent a bearing 111 in which the one end of the shift rod is adapted to slide. The opposite end of the shift rod 110 is pivotally connected at 112 to a clutch lever 113. The clutch lever 113 is pivotally mounted at 114 to a bracket 115 which is secured to the frame member 2 and is provided with bearings 116, 116 for the drive shaft 5. The clutch lever 113 is operatively connected to the movable element of the clutch 7 at 117 whereby movement of the clutch lever in the direction of the arrow illustrated in Fig. 2 will disconnect the drive shaft 5 from the driving pulley 6 and permit said pulley to revolve freely on the shaft 5, causing the stopping of the rotation of the cam ring 4 and the elements carried thereby.

Movement of the clutch lever 113 in the direction of the arrow (Fig. 2), when the retaining lever 107 is rocked out of the notch 109 in the shift rod 110, is effected by a spring 118 which, in the present instance, encircles the rod 110 and has one end secured to said rod or to the lever 113 and the opposite end secured to a fixed portion of the machine such as the frame member 2.

Figure 2:
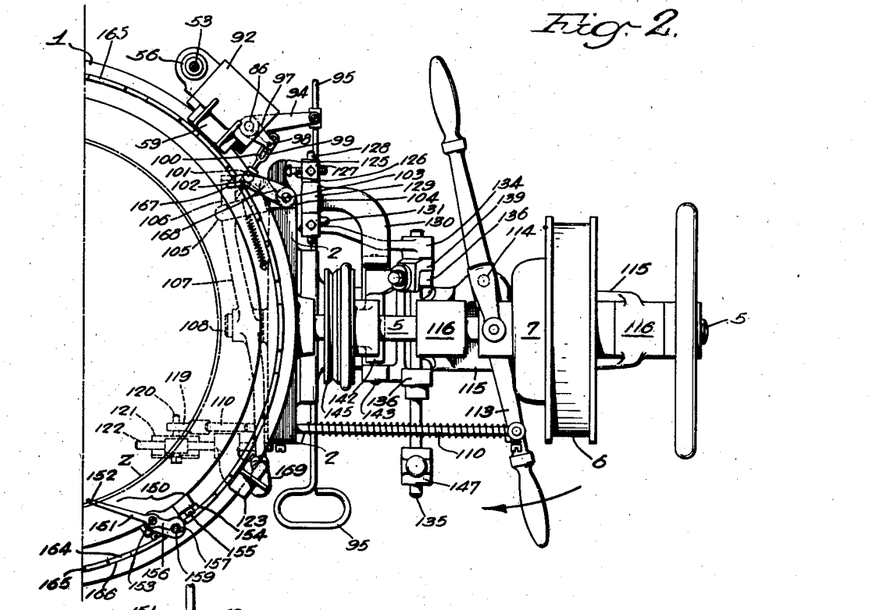
Fig. 2 is a fragmentary plan view of a portion of the mechanism illustrated in Fig. 1, drawn to an enlarged scale.

Swinging of the clutch lever 113 in the direction of the arrow shown in Fig. 2 moves the shift rod 110 longitudinally, in the same general direction as indicated by said arrow, and causes the end of the shift rod 110 which lies beyond the notch 109 to engage a lever 119 which forms a part of the movable switch element 45. Continued movement of the rod 110 rocks the switch lever 119 and the switch element 45 about the pivot 120 of the switch element and moves the switch element 45 out of contact with the switch element 46, thereby opening the one side of the electric circuit of the machine after the machine has been stopped by the energization of the motor M and thereby preventing the motor M from becoming overheated should the machine stand idle for any considerable length of time.

Figure 3:
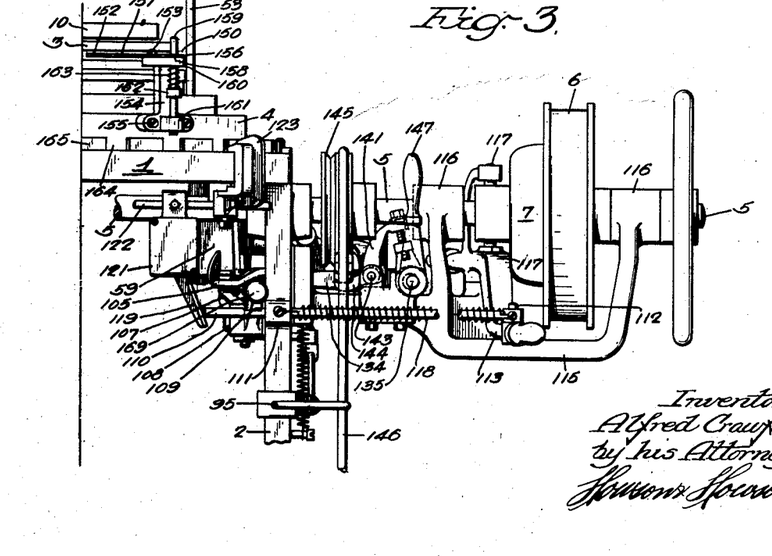
Fig. 3 is a front elevation of the mechanism shown in Fig. 2.
Figures 4, 5:
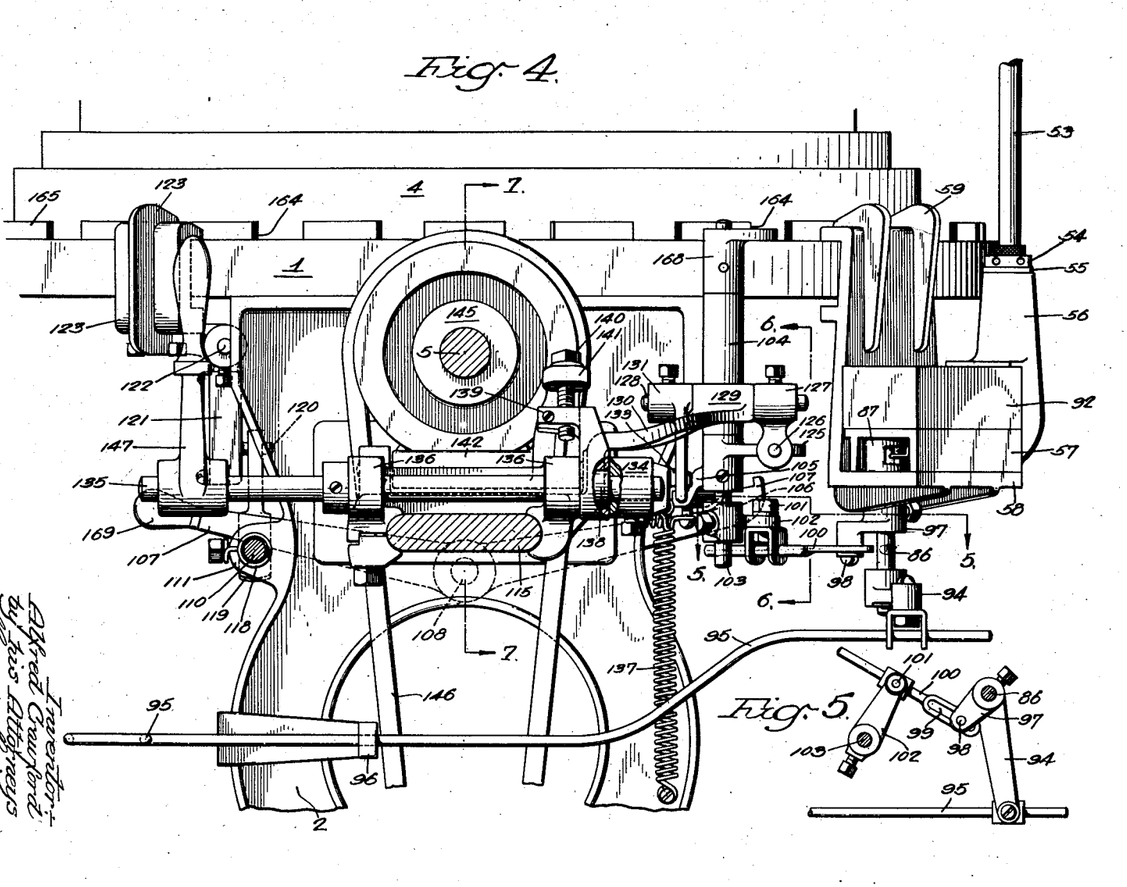
Fig. 4 is a sectional elevation taken on the line 4—4, Fig. 1, drawn to an enlarged scale.
Fig. 5 is a sectional plan view of a detail of the mechanism taken on the line 5—5, Fig. 4.

The switch elements 45 and 46 together with the one end of the switch lever 119 are enclosed within a switch box 121 which is adjustably mounted on a rod 122. The rod 122 is carried by a clamp bracket 123 arranged to be secured to the bed plate 1, as illustrated in Figs. 1, 2 and 3.

Momentum of the elements of the machine, after the clutch 7 has been operated to disconnect the drive shaft 5 from the driving pulley 6, would normally cause the cam ring 4 and the plate 10, on which the thread guides 15 are mounted, to drift for some distance before coming to a stop, in which case, should one of the threads $x$ break close to the needles, a press-off of the stitches with which the broken thread would normally have been knitted would occur. In order to prevent such a condition a suitable brake is provided to arrest movement of the machine immediately upon release of the clutch 7.

Figure 6:
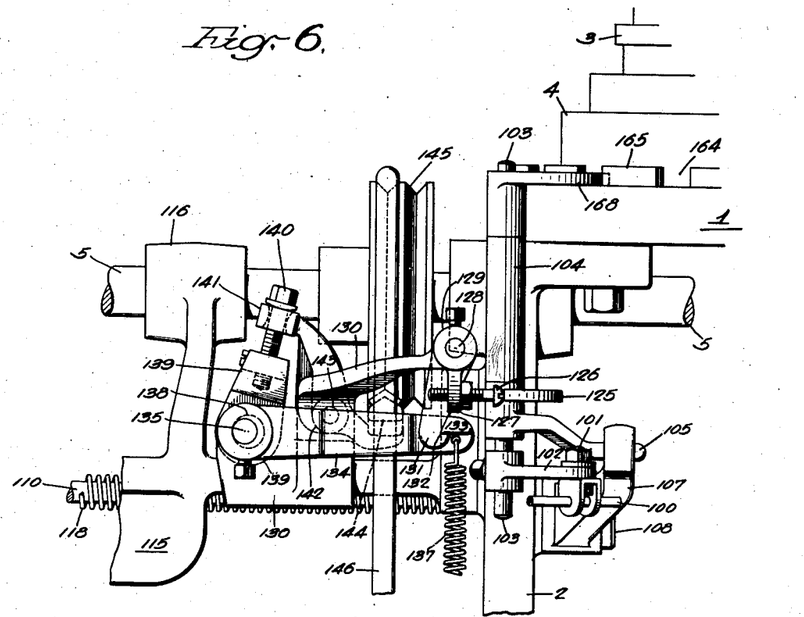
Fig. 6 is a rear elevation of the mechanism shown in Fig. 2, as looking from the plane illustrated by the line and arrows indicated at 6—6 in Fig. 4.
Figure 7:
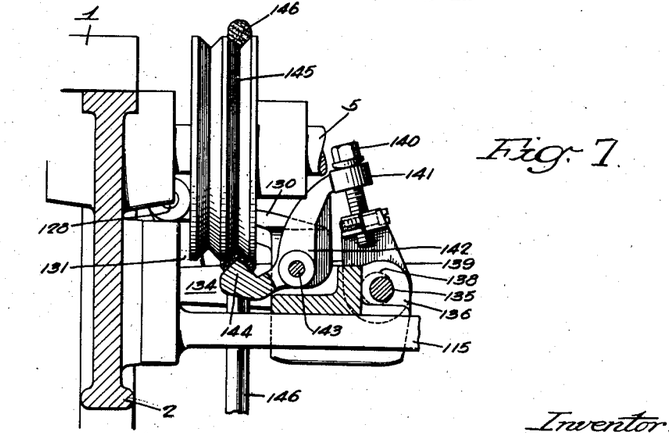
Fig. 7 is a sectional elevation as taken on the line 7—7, Fig. 4.
Figure 10:
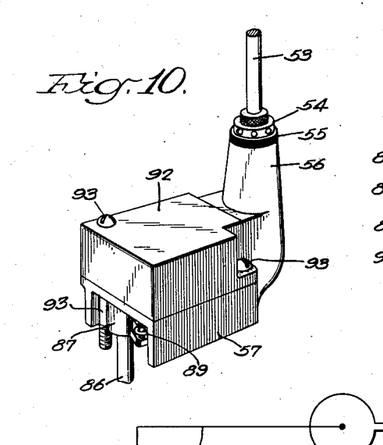
Fig. 10 is a detached perspective view of an operating motor unit forming part of the present invention.

For the purpose of arresting motion of the machine by momentum after release of the clutch 7, the knock-off shaft 103 is provided with a brake-release lever 125. The lever 125 is arranged to engage a projection 126 on a catch lever 127. The catch lever 127 is secured to a catch shaft 128 at one side of a bearing 129, in which the shaft 128 is mounted for oscillation. The bearing 129 is carried by a bracket 130 which is formed as part of or is secured to the main bracket 115. At the opposite side of the bearing 129 the catch shaft 128 is provided with a catch 131. The catch 131 is notched at 132 (see Fig. 6) and engages a lug 133 formed on a brake-applying lever 134.

The brake-applying lever 134 is secured to one end of a brake shaft 135, said brake shaft being mounted in bearings 136 formed on or carried by either the bracket 115 or the bracket 130. The brake lever 134 is adapted to be rocked in one direction by a spring 137, when the lug 133 thereof is released from the catch 131 when the catch is rocked as a result of a rocking of the trip shaft 86 in the manner above noted.

Formed on or secured to the brake shaft 135 is an eccentric 138. The eccentric 138 is encircled by a strap 139 which is provided with an adjustable reach rod 140. The reach rod 140 is operatively connected to an arm 141 which, in the present instance, forms a part of the brake element 142. The brake element 142 is pivotally mounted at 143 on the bracket 115—130 and is provided with a brake shoe 144 which is arranged to engage any suitable circular surface carried by the drive shaft 5 and which, in the present instance, is a grooved pulley 145 which normally drives the take-up mechanism of the knitting machine (not shown in the present instance)

through a belt 146 riding in the groove of said pulley.

From the above, it will be clear that energization of the motor M rocks the latch 77. This releases the tumbler 80 which, under the influence of the spring 89, swings on its pivot and releases the locking pin 84. Release of the locking pin 84 permits the locking arm 85, and consequently the trip shaft 86 to turn, under the influence of the motivating spring 89. Turning of the trip shaft 86 rocks the lever 97 and causes the pin 98 on the lever 97 to engage one end of the slot 99 in the link 100. Continued motion of the lever 97 moves the link 100 longitudinally and through the lever 102 causes a rocking motion of the knock-off shaft 103 which rocks the knock-off lever 105 and brake-release lever 125 therewith. The knock-off lever 105 riding the inclined cam surface 106 on the retaining lever 107 rocks the retaining lever 107 to release the shift rod 110, whereupon the spring 118 slides the shift rod 110 axially. Such axial movement of the shift rod 110 swings the clutch lever 113 in the direction of the arrow Fig. 2, and releases the clutch 7, whereby the drive shaft 5 is disconnected from the driving pulley 6.

The rocking of the brake-release lever 125 through the brake-catch lever 127 and catch shaft 128 rocks the brake-catch 131 to release the brake-applying lever 134. The brake-applying lever 134, under the influence of the spring 137, rocks the brake shaft 135, causing the eccentric 138 through the strap 139 and reach rod 140 to rock the brake element 142 and causing the brake shoe 144 to engage the grooved pulley 145, whereby momentum of the machine is arrested.

Resetting of the brake is effected by a hand lever 147 secured to the brake shaft 135 by which said shaft is rocked in an opposite direction from that noted above until the lug 133 on the brake-applying lever 134 is caught and held by the brake-catch 131.

Resetting of the trip shaft 86 is effected by moving the resetting rod 95 rearwardly which rocks the trip shaft 86 in a direction opposite to that above noted and which causes the pin 84 on the locking and setting arm 85 to rock the tumbler 80 until the end of the arm 81 of said tumbler snaps behind the notch 79 in the motor-activated latch 77.

The stop motion is adapted to function also if and when a needle is improperly positioned in the needle cylinder 3 during rotation of the cam ring 4 with respect thereto, for example, if a needle is left in latch-clearing position when it should be in casting position as a result of a broken butt, etc.

For the above noted purpose, the cam ring, or some element rotatable concurrently therewith, is provided with at least one needle detector 150 and preferably one for each thread feed.

Each needle detector 150 comprises a finger 151 horizontally disposed with one end 152 projecting over the needle circle z. The finger 151 is pivoted at 153 to a bracket 154 for swinging motion in a horizontal plane. The bracket 154 is secured, in the present instance, to the cam ring 4 by screws 155.

The second end 156 of the finger 151 is recessed at 157 to fit within a circumferential groove 158 formed in a trip bolt 159. The trip bolt 159 is slidably mounted for vertical movement in bearings 160, 161 formed on the bracket 154 and is provided with a collar 162 therebetween.

Encircling the trip bolt 159, between the bearing 160 and the collar 162, is a spring 163 which tends to project the bolt downwardly immediately upon rocking of the end 156 of the detector finger 151 out of the annular groove 158 in the bolt 159.

Downward movement of the bolt 159 causes the lower end thereof to drop into one of a series of notches 164 formed in a trip ring 165 which normally lies quiescently in a groove 166 formed in the bed plate 1 concentric to the axis of the needle cylinder 3 and cam ring 4.

Dropping of the bolt 159 into one of the notches 164 of the trip ring 165 while the cam ring 4 is in motion causes the trip ring to revolve with the cam ring.

Lying in one of the notches 164 of the trip ring 165 is one end 167 of a trip lever 168 which is secured to the knock-off shaft 103 and which, when the trip ring 165 is turned with the cam ring 4, is rocked by said trip ring and in turn rocks the knock-off shaft 103 to stop the machine in the manner above noted.

Resetting of the trip bolt 159 is effected by merely raising said bolt until the annular groove 158 therein is in the plane of the finger 151 and by swinging the finger until the end 156 thereof enters the groove 158 in the bolt 159.

The machine may be manually stopped by lifting the handle 169 formed on the forward end of the retaining lever 107, whereby the lever 107 releases the shift rod 110 permitting the spring 118 to swing the clutch lever 113 in the direction of the arrow in Fig. 2 to release the clutch 7 and thereby stop the machine in the manner above noted. Normally under manual stopping of the machine in this manner the brake 144 would not be applied and the machine would stop when the momentum of the moving parts is spent.

The clutch 7 is reengaged to start the machine by swinging the clutch lever 113 in the direction opposite to that indicated by the arrow in Fig. 2 but such starting of the machine cannot be accomplished until the brake, the trip shaft, and the knock-off shaft have been reset by operation of the lever 147 and rod 95 in the manner above noted as otherwise the retaining lever 107 would not be in position to engage the notch 109 in the shift rod 110 to retain the clutch 7 in its driving condition.

Figs. 17 to 21 inclusive illustrate the actuating motor unit including the trolley pole 53, the trolley pole supporting bracket 56, the base 57 of said bracket, the housing 92 for the motor M as being mounted on a platform 58a forming part of a bracket 59a which, like the bracket 59 of the unit shown in Fig. 11, etc., is arranged to be secured to the bed plate or other framework (not shown) of a Stafford and Holt machine.

The trip shaft 86 projects downwardly below the platform 59a and is provided with a lever 97a arranged to operate a lever 102a which is pivotally mounted at 103a to the bracket 59a with a knock-off lever 105a pivotally mounted upon the pivot 103a and secured to the lever 102a for actuation thereby.

The lever 97a functions in the same capacity as the previously mentioned trip lever 97, to operate the knock-off lever 105a in substantially the same manner as the knock-off lever 105 is actuated, said knock-off lever 105a, in the present instance, being connected to the ordinary mechanism of the Stafford and Holt machine by which the clutch thereof is released to disengage the main drive shaft from the driving pulley or in machines where tight and loose pulleys are employed to shift the driving belt from the tight to the loose pulley to effect stopping of the machine. Momentum of the machine is arrested in substantially the same manner as above noted. Pivoted at 103a and in the present instance forming a part of the trip lever 102a is a brake release lever 125a. The brake release lever 125a in this instance engages a brake catch operating element in the form of a pin 127a. The pin 127a is rigidly connected to the brake catch 131a which, in the present instance, is in the form of a sliding bolt and is provided with a notch 132a adapted to engage a lug 133a on the brake-applying lever 134a. The brake-applying lever 134a is arranged to be swung in a direction to apply the brake by a spring 137a. The brake-applying lever 134a is secured to a brake shaft 135a having an eccentric 138a which is encircled by a strap 139a. The strap 139a is connected by a reach rod 140a to the brake element 142a which carries a brake shoe 144a arranged to engage a circular surface on the main drive shaft such as a pulley having a flat face and secured to the main drive shaft. The operation of the device will be obvious from the description of the operation of the device disclosed in Figs. 1 to 16 inclusive. For example, when the motor M is energized the trip shaft 86 is rocked in the same manner as above noted, causing the trip lever 97a to actuate the trip lever 102a which in turn actuates the knock-off lever 105a to effect release of the main drive shaft from the source of power normally connected to said drive shaft for operating the machine to which the stop motion is applied.

Operation of the drive lever 102a also effects operation of the brake release lever 125a which in turn functions to operate the brake catch 131a to release the brake-applying lever 134a. The brake-applying lever 134a under the influence of the spring 137a turns the brake shaft 135a and through the eccentric 138a, strap 139a and reach rod 140a rocks the brake element 142a to apply the brake shoe 144a to any suitable rotating element fixed to the drive shaft of the machine.

In the device shown in Figs. 22 to 26 inclusive, the motor unit including the trolley pole 53, its supporting bracket 56, the base 57 of said bracket and the casing 92 which encloses the motor M is secured to a platform 58b forming part of the bracket 59b which is arranged to be secured to the bed plate or other frame member of a Leighton machine. In this instance the trip shaft 86 projects downwardly through the platform 58b and is provided with a trip lever 97b arranged to operate a trip lever 102b which is pivotally mounted at 103b to the bracket 59b. Also pivotally mounted at 103b is a knock-off lever 105b which is operatively connected to the trip lever 102b, said knock-off lever 105b being arranged to be connected to the normal mechanism of the Leighton machine by which the main drive shaft of the machine is released from the source of power which normally effects operation of the machine through said drive shaft. In this instance, the arresting of the momentum of the machine, after the main drive shaft is released from the source of power, is effected by a second trip lever 97c secured to the trip shaft 86. The trip lever 97c is operatively connected to a trip lever 102c which is pivotally mounted at 103c to the underside of the platform 58b. Pivoted also at 103c and, in the present instance, forming a part of the trip lever 102c is a brake release lever 125b. The brake release lever 125b is arranged to engage a brake catch operating element 127b which, in the present instance, is in the form of a pin integrally connected to the catch 131b, said catch, in the present instance, being in the form of a bolt slidably mounted in the bracket 59b. The brake catch 131b is notched at 132b to engage a lug 133b formed on the brake-applying lever 134b. The brake-applying lever 134b is mounted on a shaft 135b and is arranged to rock said shaft in one direction through the influence of a spring 137b when the brake catch 131b is operated through actuation of the trip shaft 86 to release the brake-applying lever 134b. The brake shaft 135b is provided with an eccentric 138b. The eccentric 138b is encircled by a strap 139b, said strap being connected by a reach rod 140b to the brake element 142b which is pivoted at 143b to the bracket 59b. The brake element 142b carries a brake shoe 144b adapted to engage any suitable circular surface fixed to and rotating with the main drive shaft of the machine.

The object of the present invention as noted in the preamble of the present specification, i. e. the quickening of the action of the stop motion disclosed in the prior patent noted above, is attained by the direct mechanical connections between the electrically controlled trip motor and the power and brake mechanisms. In the said prior patent the electrically-operated trip motor controlled a trip bolt, similar to the bolt 159 above noted, and when the trip motor was actuated by some irregularity in one or more of the knitting threads it released the trip bolt whereupon the trip moved downwardly under the action of a motivating spring. At times the trip bolt engaged the top edge of the trip ring and was required to move, with the cam ring, some distance before the trip bolt dropped into one of the recesses of the trip ring after which the trip bolt and trip ring, then moving with the cam ring, were required to move an additional distance before the trip ring effected release of the shift rod. Then it required the shift rod a certain amount of time to shift the driving belt from the tight to the loose pulley for interrupting the power to the machine. Furthermore, the machine was not provided with a brake, consequently the machine would drift to some extent under its own momentum before coming to a full stop.

As a result of the above, should a thread break close to the needles a press-off would occur, the extent of the press-off depending upon how close to the needles the thread broke and how far the machine moved after the break was detected and transmitted by the trip motor to the mechanical elements through which the interruption of power is effected.

In the present case, the action of the stop motion is quickened because the trip motor is now mounted on a stationary part of the machine and coupled directly to the power interrupting and brake-applying mechanisms of the machine; and because the drive of the machine is made through a quick releasing clutch rather than through the slower acting tight and loose pulley. Consequently, should a thread break close to the needles the machine is stopped instantaneously and no press-off occurs, or, if the thread should break directly at the needles the extent of the press-off which could not be avoided under such circumstances will be reduced to a minimum.

Figs. 27 to 32 inclusive illustrate a modified form of trip motor. The purpose of the structure shown in said figures is to increase the amount of power delivered by the trip shaft 86 and to decrease the amount of power necessary to release the trip shaft.

The motor unit shown in Figs. 27 to 32 includes a main bracket 59c. The bracket 59c is provided with an integral shelf or platform 58c and a bearing 58d in which the trip shaft 86a is rotatably mounted.

Figure 27:
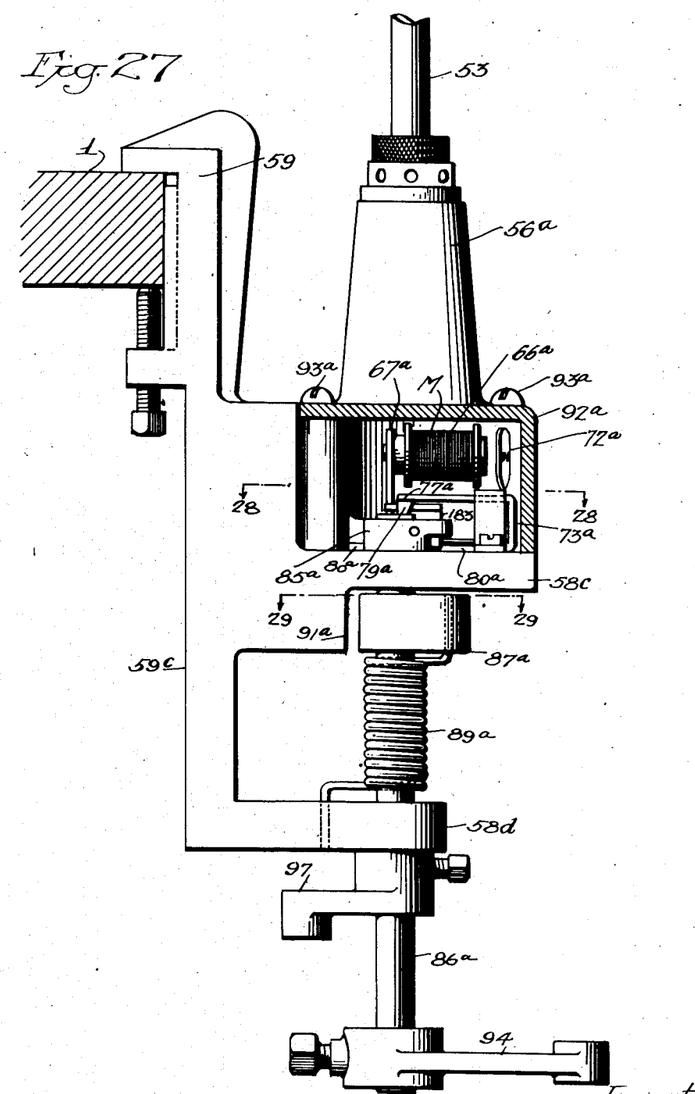
Fig. 27 is a view similar to Fig. 11 but showing a modified form of motor unit and supporting bracket.
Figure 28:
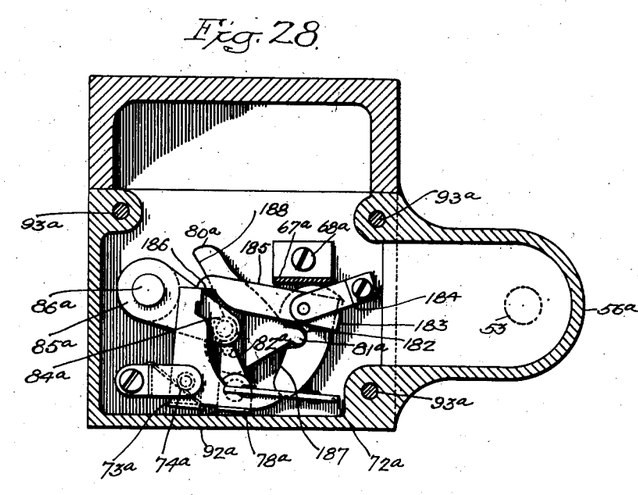
Fig. 28 is a sectional plan view taken on the line 28—28, Fig. 27.
Figures 29, 30:
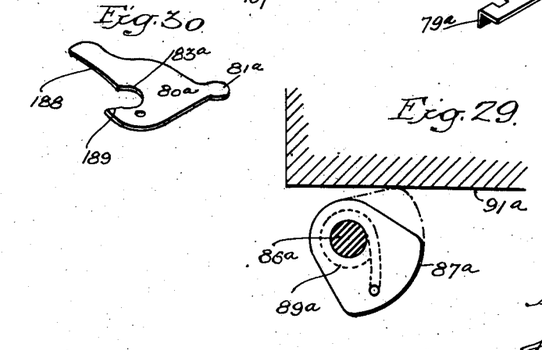
Fig. 29 is a sectional plan view taken on the line 29—29, Fig. 27.
Figs. 30, 31 and 32 are detail perspective views of various levers forming part of the motor unit shown in Figs. 27 and 28.
Figure 31:
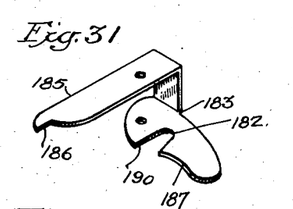
Figure 32:
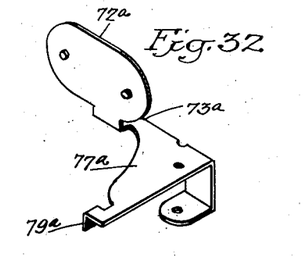

The trip shaft 86a is provided with a power lever 87a to which is secured one end of a powerful coiled spring 89a, the opposite end of which is secured to the bracket bearing 58d. When released, the spring 89a turns the shaft 86a until the power lever 87a engages a stop 91a on the bracket 59c.

The upper end of the trip shaft 86a is provided with a locking and setting arm 85a. This arm is provided with a locking and setting pin 84a which, when the trip shaft is "set" fits in a recess 83a formed in a tumbler lever 80a.

The tumbler lever 80a is pivoted at 82a on the platform 58a and is provided with a rounded projection 81a which, when the trip shaft 86a is "set" fits into a recess 182 of a holding lever 183, said holding lever being pivoted at 184 to the platform 58a.

The holding lever 183 is provided with an arm 185 at the outer end of which is formed a trigger surface 186. The trigger surface 186 engages a lug 79a formed on one arm 77a of a bell-crank latch or trigger lever 73a.

The latch or trigger lever 73a is pivoted at 74a on the platform 58a and is provided with an arm 72a in the form of a plate which lies across the axes of the coils 66a of the motor magnet M and functions as the movable armature of the motor.

The motor M is mounted on a bracket 67a secured by a screw 68a to the platform 58a.

Fig. 28 shows the trip shaft 86a in its "set" position with the various levers 73a, 183, 80a and 85a in the positions above noted. It will be noted that the pin 84a on the locking and setting lever 85a engages the tumbler lever 80a relatively close to the pivot 82a of said tumbler lever. The end 81a of the tumbler lever, which is distantly situated with respect to the pivot 82a of the tumbler lever, engages the holding lever 183 at a point close to the pivot 184 of the lever 183. The trigger surface 186 being distantly situated with respect to the pivot 184 of the holding lever 183, engages the trigger or latch lever 73a.

The multiplied leverage noted makes it possible to increase the strength of the power spring 89a; and at the same time this multiplied leverage so effectively controls the increased power of the spring 89a that a very slight magnetic pull on the armature plate 72a of the latch or trigger 83a by energizing the coils 66a of the motor M with a very low voltage current can instantly release the trip shaft 86a to turn under the power of the spring 89a to stop the machine.

The trip shaft 86a is provided with a trip lever 87 and a resetting lever 84, the same as noted above.

When the latch or trigger lever 73a is rocked by energization of the motor coils 66, the lug 79a thereof moves out of the path of movement of the outer end 186 of the holding lever 183. The lever 183 swings on its pivot and releases the rounded end 81a of the tumbler lever 80a. Said rounded end slides on the curved surface 187 of the lever 183 and thereby maintains contact with the lever 183 at all times.

The tumbler lever 80a in turning on its pivot releases the locking pin 84a of the locking and resetting lever 85a from the recess 83a of tumbler lever 80a which slides along the curved surface 188 of the tumbler lever 80a and thereby retains contact therewith at all times.

In resetting the shaft 86a, the pin 84a slides in the opposite direction along the curved surface 188 of the tumbler lever 80a until the recess 83a is reached, whereupon the pin 84a engages a shoulder 189 on the tumbler lever 80a. This swings the tumbler lever on its pivot and causes the rounded end 81a thereof to slide along the curved surface 187 of the holding lever 183 until the recess 182 is reached, whereupon the rounded end 81a of the tumbler lever engages a shoulder 190 on the holding lever 183. This swings the holding lever 183 on its pivot and permits the trigger lug 79a on the trigger or latch lever 73a to move into position, by its spring 75a, in the path of movement of the trigger surface 186 of the holding lever 183. Release of the resetting lever 94 permits the spring 89a to turn the shaft 86a a very slight distance to bring the surface 186 of the lever 183 firmly against the trigger lug 79a of the trigger or latch lever 73a, leaving the mechanism in its "set" position ready for release by a subsequent energization of the motor coils 66a.

As shown in Figs. 27 and 28, the motor unit is housed in a casing 92a which rests on and is secured to the platform 58a by screws 93a. If desired, the trolley supporting bracket may be formed integral with the casing 92a as indicated at 56a in Fig. 28.

I claim:

1. In a stop motion for knitting machines, a unit comprising a bracket arranged to be secured to a rigid portion of the machine, an electric trip motor carried by said bracket, and an electric current collector for said motor carried by said bracket adjacent said motor and directly connected thereto.

2. In a stop motion for knitting machines, a unit comprising a bracket arranged to be secured to a rigid portion of the machine, an electric trip motor carried by said bracket, an electric current collector for said motor carried by said bracket adjacent said motor and directly connected thereto, and means carried by said bracket and rendered effective by operation of said motor for stopping a machine to which said bracket is applied.

3. In a stop motion for knitting machines, a unit comprising a bracket arranged to be secured to a rigid portion of the machine, an electric trip motor carried by said bracket, an electric current collector for said motor carried by said bracket adjacent said motor and directly connected thereto, a trip shaft carried by said bracket, means carried by said bracket and rendered effective by operation of said motor for turning said trip shaft, and an element on said trip shaft and turnable therewith for effecting stopping of a machine to which said bracket is applied.

4. In a stop motion for knitting machines, a unit comprising a bracket arranged to be secured to a rigid portion of the machine, a base carried by said bracket, an electric trip motor carried by said base, a current collector for said motor carried by said base, a trip shaft pivotally mounted in said base, motivating means for turning the shaft in one direction mounted in said base, means carried by said base for holding said shaft against rotation by said motivating means, means carried by said base and operable by said motor for releasing said shaft, and means on and operable with said shaft for effecting stopping of the machine.

5. In a stop motion for knitting machines, a unit comprising a bracket arranged to be secured to a rigid portion of the machine, a base carried by said bracket, an electric trip motor carried by said base, a current collector for said motor carried by said base, a trip shaft pivotally mounted in said base, motivating means for turning the shaft in one direction mounted in said base, a tumbler lever pivotally mounted on said base, a locking lever on said trip shaft, a locking pin on said locking lever and engageable with said tumbler, a latch engageable with said tumbler for holding the trip shaft against said rotation and operable by said motor for releasing said shaft.

6. In a stop motion for knitting machines, a unit comprising a bracket arranged to be secured to a rigid portion of said machine, an electric trip motor, a rotatable trip shaft, a spring for turning the trip shaft in one direction, a latch holding said shaft against said turning and operable by said motor to release said shaft, and a plurality of leverage multiplying elements between said shaft and said latch for holding said shaft against the force of said spring and for facilitating the release of said shaft by a relatively lesser force applied by said trip motor to said latch, all supported solely by said bracket.

7. In a stop motion for knitting machines, the combination of an electric trip motor, a rotatable trip shaft, a spring for turning the trip shaft in one direction, a latch holding said shaft against said turning and operable by said motor to release said shaft, and a plurality of leverage multiplying elements between said shaft and said latch for holding said shaft against the force of said spring and for facilitating the release of said shaft by a relatively lesser force applied by said trip motor to said latch.

8. In a stop motion for knitting machines, the combination of an electric trip motor, a rotatable trip shaft, a spring for turning the trip shaft in one direction, a latch holding said shaft against said turning and operable by said motor to release said shaft, a plurality of leverage multiplying elements between said shaft and said latch for holding said shaft against the force of said spring and for facilitating the release of said shaft by a relatively lesser force applied by said trip motor to said latch, said elements including a locking lever secured to the trip shaft, and a pivoted tumble lever engaged by said locking lever adjacent the pivot of the tumble lever and by said latch remotely to said pivot.

9. In a stop motion for knitting machines, the combination of an electric trip motor, a rotatable trip shaft, a spring for turning the trip shaft in one direction, a latch holding said shaft against said turning and operable by said motor to release said shaft, a plurality of leverage multiplying elements between said shaft and said latch for holding said shaft against the force of said spring and for facilitating the release of said shaft by a relatively lesser force applied by said trip motor to said latch, said elements including a locking lever secured to the trip shaft, a pivoted tumbler lever engaged by said locking lever adjacent the pivot of the tumbler lever, and a pivoted holding lever engaging the tumbler lever remote to the tumbler lever pivot and adjacent the holding lever pivot, said holding lever being engaged by said latch remote to the pivot of the holding lever.

10. In a stop motion for knitting machines, comprising electric thread detecting means, an electric trip motor operable by said detecting means, a trip shaft operable by said motor, means operable by said shaft for stopping said machine and including a brake engageable with a rotary element of said machine, a brake shaft, an eccentric on said shaft, means operable by said eccentric and connected to said brake for applying said brake, a brake-applying lever operably connected to said brake shaft, means normally effective to turn said brake-applying lever for applying said brake, a brake catch maintaining said brake applying lever normally ineffective, and means operable by said trip shaft for releasing said brake catch.

11. In a stop motion for knitting machines, comprising electric thread detecting means, an electric trip motor operable by said detecting means, a trip shaft operable by said motor, means operable by said shaft for stopping said machine and including a power controlling lever, a brake-applying lever, means normally effective to swing said power lever to a position to interrupt operation of said machine, means maintaining said power control lever in position to effect operation of said machine, means normally effective to swing said brake-applying lever to arrest operation of said machine, means maintaining said brake lever against said arresting movement, a knock-off shaft operably connected to said trip shaft for operation thereby, and means on said knock-off shaft for releasing said power lever retaining means and said brake lever retaining means upon operation of said trip shaft by said trip motor.

12. In a stop motion for knitting machines, comprising electric thread detecting means, an electric trip motor operable by said detecting means, a trip shaft operable by said motor, means operable by said shaft for stopping said machine and including a power controlling lever, a brake-applying lever, means normally effective to swing said power lever to a position to interrupt operation of said machine, means maintaining said power control lever in position to effect operation of said machine, means normally effective to swing said brake-applying lever to arrest operation of said machine, means maintaining said brake lever against said arresting movement, a knock-off shaft operably connected to said trip shaft for operation thereby, means on said knock-off shaft for releasing said power lever retaining means and said brake lever retaining means upon operation of said trip shaft by said trip motor, needle detecting means, a trip ring operable by said needle-detecting means, and a lever on said knock-off shaft operable by said trip ring for stopping said machine upon operation of said needle-detecting means.

ALFRED CRAWFORD.